UNITED STATES PATENT OFFICE.

THOMAS DRAYTON, OF BRIGHTON, ENGLAND.

IMPROVEMENT IN SILVERING LOOKING-GLASSES.

Specification forming part of Letters Patent No. 3,702, dated August 12, 1844.

*To all whom it may concern:*

Be it known that I, THOMAS DRAYTON, a subject of the Queen of Great Britain, and now residing at Brighton, in the county of Sussex, gentleman, have invented or discovered new and useful Improvements in Coating Glass with Silver for Looking-Glasses and other uses; and I, the said THOMAS DRAYTON, do hereby declare that the nature of my said invention and the manner in which the same is to be performed are fully described and ascertained in and by the following statement thereof—that is to say:

The invention consists of causing silver to be deposited onto glass from a solution of silver by deoxidizing the oxide of silver in solution in such a manner that the precipitate of silver will adhere to the glass without previous coating of metallic substances to the glass.

In order that the invention may be fully understood and readily carried into effect, I will proceed to describe the means pursued by me.

I would first remark that the invention is applicable in the manufacture of looking-glass and in other cases where it is desired to have glass coated with silver.

It is well known that in silvering glass in the making of looking-glasses as at present practiced by the use of quicksilver the process is very unhealthy, and it is an important feature in this invention that this injurious and unhealthy process is dispensed with, and the glass is coated with silver deposited from a solution of silver, giving a more beneficial result and a very beautiful effect. The solution of silver which I employ is what is well known as "nitrate of silver," and I employ the oil of cassia and the oil of cloves for deoxidizing the oxide of silver in solution. I take at the rate of one ounce of nitrate of silver and mix therewith half an ounce of spirits of hartshorn, and with these I combine two ounces of water and let the mixture stand twenty-four hours, then filter the same and combine therewith three ounces of spirit. I prefer spirits of wine or naphtha, and I add from twenty to thirty drops of oil of cassia. The mixture or liquid, after having remained for five or six hours, is ready for use, and I have found it desirable not to keep the mixture more than twenty-four hours after the oil of cassia has been combined therewith; but the other part of the mixture appears to improve by keeping, and is applied in the following manner, supposing the glass to be in a horizontal position: I form a projecting fence at all sides with putty or other suitable material, so that the liquid can cover the whole surface of the glass which is to be silvered to the depth of one-eighth to a quarter of an inch deep, the surface of the glass being clean and polished before pouring on the liquor above described, and when the liquor has been run onto the surface of the glass a few drops—say from six to twelve—of oil of cloves are to be dropped at different places into the liquor on the glass, (that quantity of oil of cloves being previously diluted with spirits of wine in proportion of one of cloves, by measure, to three of spirits of wine,) such six to twelve drops of oil of cloves being the proper quantity for the quantity of liquor above mentioned; or the oil of cloves may be mixed with the liquor just before bringing the same in contact with the glass to be silvered.

It should be stated that the more oil of cloves used the more quickly does the deposit of silver take place, but I prefer that the process of precipitation or deposit should take about two hours, which a workman after a little practice will readily adjust; and it is important to call attention to the circumstance that the quality of the articles employed differ. Consequently the quantities requisite for carrying on the process most favorably will vary, but a careful workman, aided by the observations herein made, will after a little practice quickly be able to judge of the qualities, and by testing his mixtures thereof on portions of glass he will be enabled to see when the best result from particular materials has been obtained; and as different quantities of the oil of cassia purchased at different times differ very much in quality, I have found that is desirable to test each quantity purchased by ascertaining whether it will mix with the solution of silver with hartshorn, water, and spirit, and if I find that it mixes readily then I know it will be proper for the purpose, but if I find that it becomes flaky I allow it to stand after mixing it, and afterward filter the mixture.

I would state that although I have spoken of applying the liquor to the glass when in a horizontal position, it may be applied when the glass is in other positions, provided the liquor be kept in contact with the surface of the glass. I have found that if the glass to be coated be placed nearly in a vertical position and the surface covered over, leaving a narrow space for the liquor between the surface of the glass and the cover, the cover fitting close, then by simply using spirit without water in the mixture the object will be accomplished; and it is advantageous to use a glass cover where convenient, in order to prevent the loss of spirits of wine by evaporation. I have found that the use of a small quantity of the oil of thyme or of caraways varies the color of the silver, and will be useful in some cases for that purpose. The liquor having been used is poured off and allowed to stand for some time—say three or four days—in a close vessel, after which it will be fit for use by applying more spirits and nitate of silver, according to the quantities of the materials used up. The silver on the glass being perfectly dry, I varnish the same, and I prefer for such purpose beeswax and tallow, in about equal quantities, melted together.

Having thus described the nature of the invention and the means pursued by me in performing the same, I do not confine myself to the precise details herein explained, provided the peculiar character of the invention be retained, but claim to deposit silver on glass from an oxide of that metal in solution by the new process, substantially as herein described, wherein I make use of suitable deoxidizing matters in such manner as to cause the silver to adhere to glass without any previous preparation of metallic coating.

THOS. DRAYTON.

Witnesses:
W. H. RITCHIE,
JOHN ALCOCK,
*Both of Lincoln Inn, London.*